United States Patent [19]
Kutowy et al.

[11] Patent Number: 5,972,120
[45] Date of Patent: Oct. 26, 1999

[54] **EXTRACTION OF SWEET COMPOUNDS FROM *STEVIA REBAUDIANA BERTONI***

[75] Inventors: Oleh Kutowy, North Gower; Shi Qiu Zhang, Nepean; Ashwani Kumar, Orleans, all of Canada

[73] Assignee: National Research Council of Canada, Ottawa, Canada

[21] Appl. No.: 09/116,925

[22] Filed: Jul. 17, 1998

Related U.S. Application Data

[60] Provisional application No. 60/053,024, Jul. 19, 1997.
[51] Int. Cl.$^6$ .................................. C07G 3/00; A23C 1/22
[52] U.S. Cl. ........................ 127/43; 127/34; 424/195.1; 536/18.1
[58] Field of Search .................. 127/34, 43; 424/195.1; 536/18.1

[56] References Cited

PUBLICATIONS

Derwent Acc No. 1976–47060X Stevioside purifcn . . . , May 8, 1976.
Derwent Acc No. 1997–403250 Extracting stevioside . . . , Nov. 19, 1997.
Derwent Acc No. 1993–194885 Natural sugar substitute . . . , Jun. 23, 1993.

*Primary Examiner*—David Brunsman
*Attorney, Agent, or Firm*—J. Wayne Anderson

[57] ABSTRACT

The invention disclosed relates to a process for the extraction of sweet compounds from *Stevia rebaudiana Bertoni*, by column extraction, followed by purification by filtration. The extraction is at temperatures in the range of 0 to 25° C. Preferably, a pre-treatment step of microfiltration is used to clarify the extract. Purification is by ultrafiltration followed by nanofiltration. The filtration conditions are controlled to optimize the recovery of the sweet compounds.

20 Claims, 2 Drawing Sheets

EXTRACTION OF SWEET COMPOUNDS FROM STEVIA REBAUDIANA BERTONI

This application claims benefit of provisional application 60/053,024 filed Jul. 19, 1997, now abandoned.

BACKGROUND OF THE INVENTION

This invention relates to a process for separating and recovering sweet compounds from plant materials of Stevia rebaudiana Bertoni by aqueous extraction and membrane separation.

The sweet compounds in Stevia have been identified by Kinghom and Soejarto, 1985, as including stevioside, rebaudioside A(RA), rebaudioside B(RB), rebaudioside C(RC), ducloside A and ducloside B.

DESCRIPTION OF THE PRIOR ART

Extraction of components of value from plant material e.g. plant leaves for food and pharmaceuticals is widely practiced. Most of these processes use extraction by hot water and/or organic solvents for isolation of a particular compound or refining a class of compounds from the complex mixture.

There have been several studies describing the extraction and purification of sweeteners from the dried leaves of stevia plant (Adduci et al., 1987; Yokohama and Sugiyama, 1990; Liu et al., 1991). These conventional methods use large amounts of organic solvents and chemicals for refining natural source sweeteners. Also, Giovanetto, 1990 has patented a rather complicated process utilizing several unit operations including water extraction at room temperature to 65° C., a first strongly acidic ion exchange, followed by a second weakly basic ion exchange for refining steviosides.

SUMMARY OF INVENTION

It is an object of the current invention to simplify and enhance the process of separating and recovering of sweet compounds from plant material of Stevia rebaudiana Bertoni.

It is another object of the invention to enhance the separation of sweet compounds while minimizing the separation of undesirable bitter tasting compounds.

The invention generally relates to the optimization of water extraction from plant material of Stevia and subsequent filtration treatment. Preferably, the extract is pre-treated to clarify the extract e.g. by microfiltration. The clarified extract is then processed by a selected ultrafiltration membrane. The experimental conditions are optimized to elute the majority of the sweet compounds of interest. The permeate from this stage is then processed by a nanofiltration membrane at elevated temperatures. Both ultrafiltration and nanofiltration are preferably conducted in the diafiltration mode. Once most of the undesirable components are eluted, the feed is concentrated for final recovery of the sweet compounds of interest.

The diafiltration mode involves using extra extraction solvent to further process the retentate by washing out additional permeable compounds ie. the desired sweet compounds (when using an ultrafiltration membrane to remove higher molecular weight substances), or washing out undesirable impurities (when using a nanofiltration or reverse osmosis membrane, to remove lower molecular weight substances).

According to the invention a process is provided for the extraction of sweet compounds from Stevia rebaudiana Bertoni, comprising (a) providing an extraction column, the column being vertically disposed and having a top opening for receiving plant material and extraction solvent, and a bottom opening for discharging extract, (b) adding substantially dry Stevia plant material to the column to form a bed, (c) adding an aqueous extraction solvent at a temperature of 0 to 25° C. to the column, to provide a controlled plant material:solvent ratio in the range of 0.02:1 to 0.1:1 w/w, (d) removing from the column an extract including the sweet compounds, (e) passing the extract through an ultrafiltration membrane having a pore size defined by a molecular weight cut-off(mwco) of 2 to 3 kDa, at a trans-membrane pressure of 200 to 700 kPa, (f) passing the permeate including the sweet compounds, at a controlled temperature in the range of 50 to 85° C. through a high temperature nanofiltration membrane having a pore size defined by a molecular weight cut-off(mwco) of 200 to 600 Da, at a trans membrane pressure of 600 to 1300 kPa, and (g) recovering the retentate including the sweet compounds.

DESCRIPTION OF THE PREFERRED EMBODIMENTS

Figure 1:
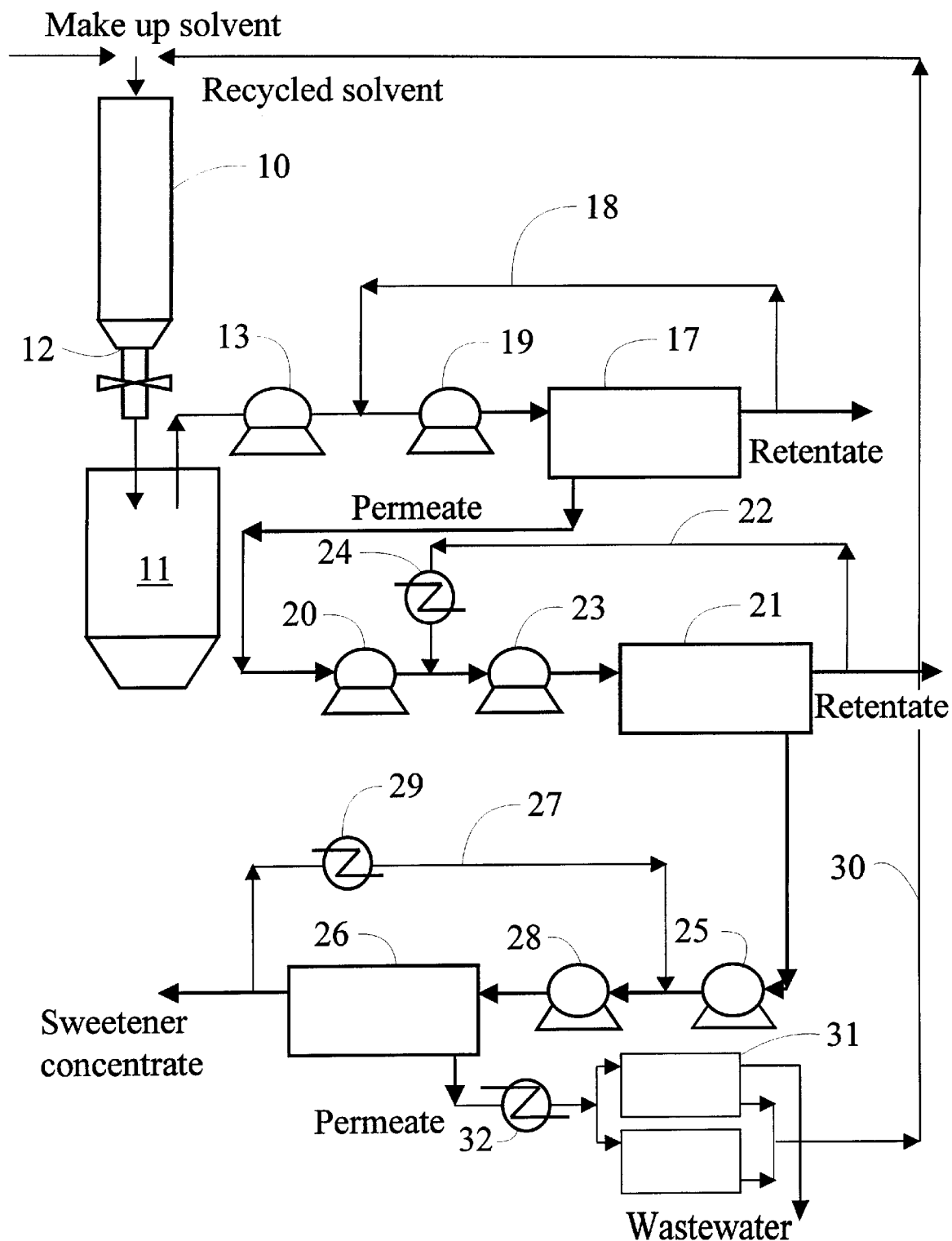
FIG. 1 is a flow diagram, illustrating a process according to the invention.

Preferably, the plant material is leaves which have been pre-dried. It has also been found that if the leaves are comminuted to a small substantially uniform size of from 10 to 40 mm, most preferably about 20 mm, extraction of the sweet compounds of interest is enhanced. The comminuted leaves also provide a good filter bed for removal of larger debris and reduce the chances of plugging the column. The amount of extraction solvent is also reduced. However, we have found that if the leaves are ground to a powder, the column becomes plugged.

We have also found that for low temperature operation ie. at the lower end of the operating range ie. 0 to 10° C., temperature control is improved by the addition to the column of ice chips, along with the dry leaves.

For enhanced selectivity of separation of the desirable sweet compounds, the temperature of the extraction solvent is preferably in the range of 2 to 6° C., most preferably about 4° C. At these lower temperatures, extraction of the undesirable higher molecular weight bitter compounds is lower than at higher temperatures.

The amount of the solvent and the leaf:solvent ratio are also controlled to enhance selectivity. We have found that with less leaf material, higher amounts of undesirable compounds are eluted. Also, if too much leaf material is added, the yield of the desirable sweet compounds decreases. Accordingly, a balance is needed. A leaf:solvent ratio of 0.03 to 0.10, by weight, has been found to be useful. The preferred water:leaf ratio is about 0.05:1.

The solvent flow rate/residence time is also significant. A flow rate in the range of 24–30 ml/minute has been found to be useful for the column dimensions used in the examples. This provides a residence time of 10 to 20 minutes.

Although all of the extraction data in our examples has been generated with gravity flow, it may also be desirable, particularly if a continuous process is employed, to use a pressurized spray to feed the extraction solvent into the column. A positive pressure will assist the control of the downflow and the residence time in the column. Pressures of about 140 kPa will suffice.

Further, extraction of the sweet compounds is also enhanced by lowering the pH of the extraction water to the acid range ie. about 2–4, preferably about 2. See Table 1, below. Also, at this pH, the solubility of some of the higher molecular weight undesirables such as proteins is lower, so they are excluded from the extract containing the sweet compounds. This is done by adding to the solvent a source of the phosphate ion e.g from phosphoric acid. Others ions such as sulphate and calcium could also be used. The addition of phosphate also enhances the value of the retained leaf material as animal fodder.

TABLE 1

The effect ot solvent pH on the stevioside extraction

| pH | Stevioside ppm | *Optical abs. of pigment at 420 nm |
|---|---|---|
| 7.0 | 8000 | 9.0 |
| 2.0 | 8100 | 5.9 |
| 9.0 | 7900 | 8.0 |

*Reference "Studies on the non-stevioside components of stevia extracts" Tang-Feng Cheng and Wei-Hsien Chang, National Science Council Monthly, Vol. XI, No. 2 February 1983.

Table 1 shows that less pigment was extracted at pH 2, while the stevioside extraction was almost the same among the solvent pH of 2, 7 and 9. Phosphoric acid was used to adjust pH to 2.

The aqueous extraction solvent is preferably water, and where sources of good quality water are not available, the use of reverse osmosis(RO) water or distilled water is recommended.

Figure 2:
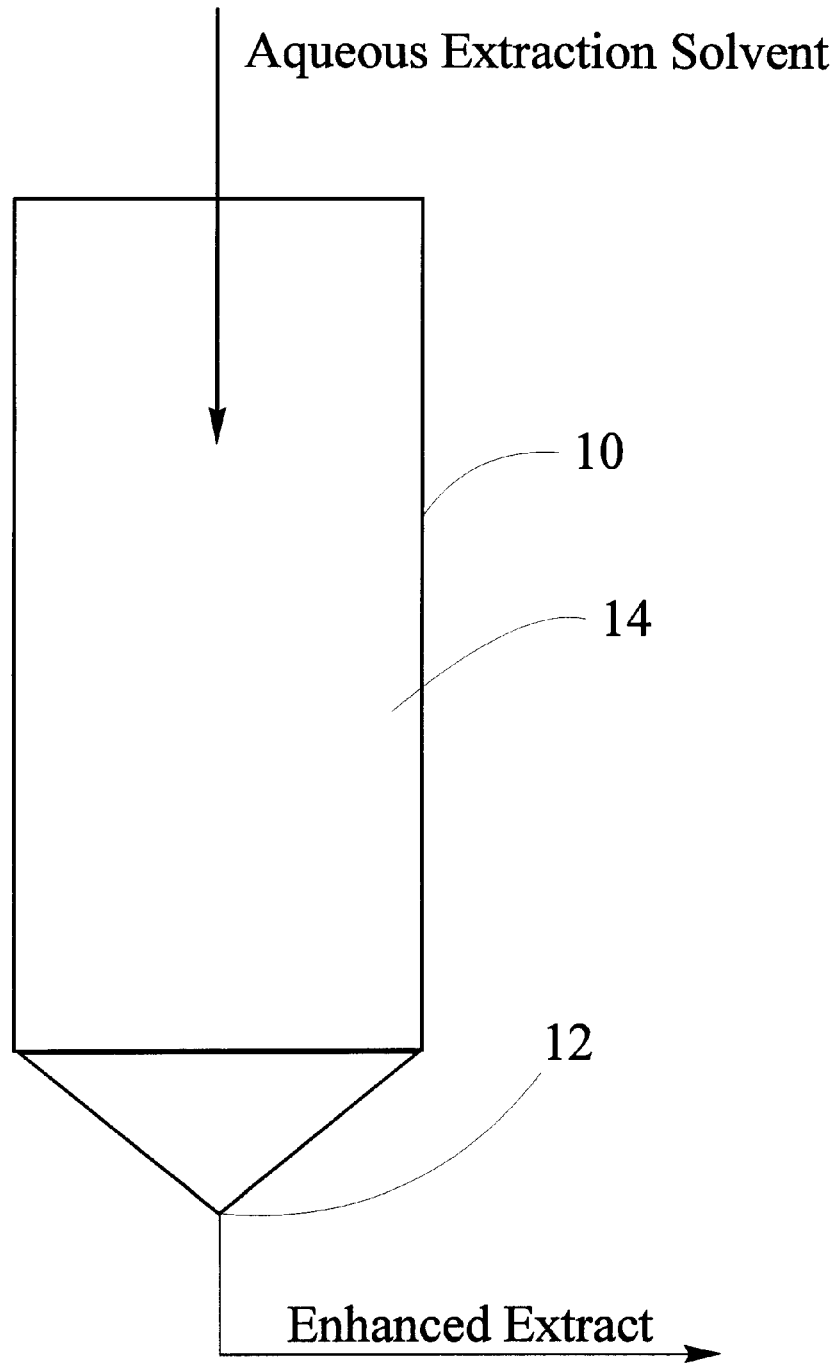
FIG. 2 is a schematic illustration in section of a extraction column used in a process according to the invention.

Respecting the operation of the process of this invention, as seen in FIGS. 1 and 2, an extraction column 10 is provided, and disposed vertically. The top of the column is open for receiving plant materials and extraction solvent. The plant material settles to the bottom and forms a bed of material 14 which acts as a filter for removal of larger debris. The bottom includes an opening 12 for removal of extract. The column is typically a glass column.

A feed vessel 11 may be used to collect the extract.

The plant leaf material is pre-dried by conventional means and comminuted to a small substantially uniform size of about 20 mm diameter. This material is added to the column. Ice chips are then added to the column for temperature control, if low temperature operation (0 to 10° C.) is involved.

Extraction water is then added to the column e.g by pressurized spraying to assist the downward flow without disturbing the leaf bed. The pH of the water may be lowered by to 2–4.

Batch extraction in water is done in the temperature range of 0–25° C. It will be appreciated that a continuous operation could also be employed, e.g. by using several columns, and while one is being drained, the next one is being filled, without departing from the concept of the invention.

Preferably, the extract from the column 10 is then pre-treated by filtering through a ceramic microfilter 17 (average pore size 0.02–0.20 μm). This unit operation clarifies the extract by removing pigments absorbing at 420 nm and other higher molecular weight materials. Pigments absorbing at 670 nm are not removed significantly. Selecting proper pre-treatment can also reduce fouling propensities of ultra-filtration membranes. Positive feed pressure (100 to 200 kPa) is provided by a feed pump 13. A diafiltration loop 18 is also preferred, with pressure being provided by a re-circulation pump 19. Other pre-treatment means, such as by the addition of a polymeric adsorbent e.g polyacrylamide, and/or lime addition is also contemplated.

The permeate is then fed to a caustic stable e.g polysulfone based, ultrafiltration membrane 21 operating at optimized conditions including a mwco of 2–3 Kda, preferably about 2.5 Kda, to remove higher molecular weight impurities (proteins, pectins and pigments) and allowing the permeation of the desired sweet compounds. Positive feed pressure is provided by a pump 20. Preferably, a diafiltration loop 22 is provided, with pressure assist from a re-circulation pump 23.

The temperature of the feed is controlled by temperature control means e.g. heat exchanger 24 located in the diafiltration loop 22 ie. in the range of 10 to 65° C. Room temperature is preferred, to save energy. It has been found that the pore size of the membrane may be controlled by controlling the feed temperature. It has also been found that temperature control of the feed for this step is not as significant as in the following nanofiltration step.

The permeate flux is also controlled ie. in the range of 35 to 65 LMH.

Trans-membrane pressure is in the range of 200 to 700 kPa.

Also, the feed flow rate is in the range of 75 to 300 LMH.

The permeate is then fed to a nanofiltration (NF) membrane 26 that is designed to operate at higher than normal temperatures (up to 85° C.). Reverse osmosis(RO) membranes can also be used, since they behave like a nanofiltration membrane at room temperature and their pores open at higher temperature. Useful membranes include Duratherm™, Desalination/Osmonics or equivalents. Positive feed pressure is provided by a pump 25.

By varying the temperature(in the range of 45° to 85° C.) of the feed stream to be treated by temperature control means e.g. heat exchanger 29 located in the diafiltration loop 27, the porosity of the membranes were altered and this characteristic is utilized to remove as permeate undesirable compounds that impart bitter-aftertaste to the sweet compounds, while the retentate includes the sweet compounds. Preferably, the mwco of the membrane is adjusted to about 400 Da.

Preferably, a diafiltration loop 27 is provided, with pressure assist from a recirculation pump 28.

The diafiltration volume is in the range of 2 to 4 times the original feed volume.

Trans-membrane pressure is in the range of 500 to 1300 kPa.

The permeate flux is in the range of 25 to 45 LMH.

The retentate comprising the desirable sweet compounds is then recovered as a concentrate and may then be dried to a powder e.g. by spray- or freeze-drying.

To reduce water consumption, a re-cycling loop 30, including filter means( e.g conventional RO membrane) 31, is provided to clarify the permeate. The temperature of the permeate is reduced to typical operating temperature for such membranes and to cool the clean water to the preferred low feed temperatures, by heat exchanger 32 provided in the recycle loop.

The following examples illustrate the practice of the present invention but should not be interpreted as limiting its scope.

The experimental procedure for all the tests were summarized as following:

Experimental Procedure

Equipment

The UF system used was SEPA CF (Osmonics) with effective membrane area of 0.0155 m². The microfiltration system used was zirconia microfiltration system with effective membrane area of 0.0055 m². The nanofiltration system module was a NF spiral membrane module (40×40 module, membrane area of 7 m²). The temperature of the feed was controlled by a heat exchanger. Each membrane unit consists of a cylindrical stainless housing. The supplier of the membrane was U.S. Filter. The membrane pore size were 0.035, 0.080 and 0.2 µm respectively.

Nitrogen blankets were applied for the feed tank or permeate tank in order to prevent air oxidization of feed/permeate.

Feed Materials

Royal Sweet International Ltd. provided the dried leaves of *Stevia rebaudiana* cultivated in China and Ontario, Canada, respectively.

Analytic Methods

Apparatus

Liquid chromatographic separations were conducted using a HP 1090 Liquid Chromatograph equipped with a diode array detector. Separations were carried out on a 5 µm CSC-SIL 80A/Amino column (Chromatography Sciences Company 25 cm×0.46 cm ID). Peak areas were determined by electronic integration. The operating conditions for HPLC were: mobile phase acetonitrile:water (82:18) buffered at pH 6.7 (pH 6.7 buffer solution was prepared by dissolving 1.0 g of sodium acetate and 0.1 g of acetic acid into 2 L of acetonitrile water mixture); flow rate 1.5 mL/min; column temperature 28° C.; injection volume 20 mL, and detector wavelength 210 nm for steviosides and 234 nm for impurities. Standard solutions were injected into the column and its retention time was determined. Beer's law standard curves were obtained by injecting different quantities of stevioside, Rebaudioside A and Rebaudioside C in the concentration of 80 ppm, 240 ppm and 600 ppm, respectively.

Sample Preparation

Two mL of aqueous sample, 15 mL of acetonitrile, 2.5 mL of buffer solution (5 g of sodium acetate, 0.5 g of Glacial acetic acid and water were added up to 1 L) and water were added into a 25 mL flask. On standing overnight and centrifuged, there were two phases observable at this stage, however only the top liquid phase was used for HPLC analysis.

The pigment in the solution was analyzed by measuring the optical absorbencies at 420 nm (A420) and 670 nm (A670), the wavelengths of pigments maximum absorbencies, using a spectrophotometer (Spectronic Genesys 2).

Membrane Characterization

Prior to the feed tests, all the UF membranes were characterized by 200 ppm solution of PEG of 3 kDa molecular weight. Operating pressure was 276 kPa and temperature was 22–24° C. The NF membranes were characterized by 200 ppm solution of PEG of 400 Da molecular weight at an operating pressure of 585 kPa and a temperature of 20, 40, 60 and 70° C.

Membrane Cleaning

The membranes were cleaned in place after each test using a recycling technique. In this technique the membranes were first flushed with tap water at room temperature. The membranes were then washed with 0.2 N NaOH for 30 minutes. Finally, the system was thoroughly flushed with room temperature distilled water. In some circumstances, membranes were soaked in 1.5% Ultrasil™ 53 solution overnight. (The powdered enzymatic detergent membrane cleaner, Ultrasil™ 53 was chosen because it is authorized by the U.S. Department of Agriculture for use in Federally inspected meat and poultry plants as a cleaner for reverse osmosis and ultrafiltration membranes.) Thoroughness of the cleaning was tested by measuring the pure water permeate rate after 30 minutes. The system was deemed clean when this was not significantly different from the pure water permeation rate of an unexposed membrane.

EXAMPLES

Extracting Runs

A carefully weighed amount of dried leaves were placed in a standard glass column (0.6 m long and 28 mm ID). Reverse osmosis or distilled water maintained at 4 or 25° C. was used for extraction products from leaves at different water to leaf ratios. The following examples are for the case of a leaf to water ratio of 0.05 w/w. The extracts from the column were analyzed by HPLC as described above for determining the concentration of sweeteners. Typical results at two different extracting temperatures are shown below:

Composition of extract produced using extraction water of varying temperatures

TABLE 2

| Temperature | Concentration, mg/L | | | Optical* Absorption |
|---|---|---|---|---|
| ° C. | Stevioside | RC | RA | Of pigment at 420 nm |
| 4 | 197 | 21.7 | 57.6 | 2.3 |
| 25 | 245 | 27.9 | 73.6 | 3.2 |

RC — Rebaudioside C;
RA — Rebaudioside A,
*Reference "Studies on the non-stevioside components of stevia extracts" Tang-Feng Cheng and Wei-Hsien Chang, National Science Council Monthly, Vol. XI, No. 2 February 1983.

Pretreatment Runs

A U.S. Filter laboratory scale ceramic microfiltration membrane (pore size 0.035 µm; surface area 0.005 m²) was used for pre-treatment. These membranes did not retain the compounds of interest, and provided a retentate including higher molecular weight compounds, emulsions, suspended solids and pigments measured at 420 nm. The following table illustrates a typical example of high percentage recoveries of various sweeteners with MF treatment without diafiltration at a trans-membrane pressure of 104 kPa for cold water (4° C.) extracted sample.

TABLE 3

| Pore size, | Recoveries, % | | |
|---|---|---|---|
| µm | Stevioside | RC | RA |
| 3.5 | 78.3 | 77.4 | 77.8 |
| 8.0 | 74.8 | 81.8 | 79.0 |

Ultrafiltration Runs

Permeate from MF pre-treatment in the present example was processed by a polysulfone based ultrafiltration membrane with a nominal molecular weight cut-off of 2.5 kilo Daltons at a trans-membrane pressure of 440 kPa at 22° C. The circulation velocity is 0.6 m/s. The following table illustrates that concentration of stevioside decreases with increase in diafiltration volume. There is no significant fouling of membranes as indicated by enhanced permeation rates during the experiment.

TABLE 4

| Diafiltration volume | Concentration, g/L Stevioside | Permeation rate, LMH |
| --- | --- | --- |
| 0 | 1.51 | 35 |
| 2.0 | 0.75 | 47 |
| 3 | 0.25 | 64 |
| 4 | Not detected | 65 |

LMH — liters per square meter per hour

Nanofiltration Runs

Permeate stream from ultrafiltration treatment heated to about 80° C. was treated by a commercial nanofiltration membranes (mwco 400 Da) designed to operate up to 80° C. temperatures. The concentration of the permeate is done very effectively by nanofiltration membrane operating at a trans-membrane pressure of 517 kPa and at a temperature of 80° C. in diafiltration mode. For example, it was shown that at 80° C. the amounts of impurities absorbing at 420 nm (the components that are not identified as sweeteners) in the retentate was reduced by about 55% while no sweeteners were detected in the permeate stream. At 50° C., the amount of impurities in the retentate is reduced by about 89%. Accordingly, at higher temperatures, more of the undesirable bitter compounds will remain in solution and pass through the nanofilter. The higher temperature is therefore preferred.

We claim:

1. A process for the extraction of sweet compounds from *Stevia rebaudiana Bertoni*, comprising (a) providing an extraction column, the column being vertically disposed and having a top opening for receiving plant material and extraction solvent, and a bottom opening for discharging extract, (b) adding substantially dry Stevia plant material to the column to form a bed, (c) adding an aqueous extraction solvent at a temperature of 0 to 25° C. to the column, to provide a controlled plant material: solvent ratio in the range of 0.02:1 to 0.1:1 w/w, (d) removing from the column an extract including the sweet compounds, (e) passing the extract through an ultrafiltration membrane having a pore size defined by a molecular weight cut-off (mwco) of 2 to 3 k Da, at a trans-membrane pressure of 200 to 700 kPa, (f) passing the permeate including the sweet compounds, at a controlled temperature in the range of 50 to 85° C. through a high temperature nanofiltration membrane having a pore size defined by a molecular weight cut-off of 200 to 600 Da, at a trans-membrane pressure of 600 to 1300 kPa, and (g) recovering the retentate including the sweet compounds.

2. A process according to claim 1, wherein following step (e) a diafiltration step is performed, and wherein the permeate including additional sweet compounds is passed to step (f).

3. A process according to claim 2, wherein after step (f), a diafiltration step is performed, to provide additional retentate including the sweet compounds.

4. A process according to claim 3, wherein the diafiltration volume is 2 to 4 times the feed volume.

5. A process according to claim 3, wherein following step (d), the extract is passed through a microfiltration membrane of pore size in the range of 0.02 to 0.20 μm at a trans-membrane pressure of 100 to 200 kPa.

6. A process according to claim 5, wherein the process is continuous, and wherein step (c) the solvent is added by pressurized spray.

7. A process according to claim 4, including the additional step of diafiltration.

8. A process according to claim 7, wherein step (e), the extract is provided at a controlled temperature of 10 to 65° C.

9. A process according to claim 8, wherein step (c) the temperature of the solvent is 2 to 6° C.

10. A process according to claim 8, wherein step (c) the pH of the aqueous solvent is lowered to 2 to 4.

11. A process according to claim 10, wherein the pH is lowered by the phosphate ion.

12. A process according to claim 11, wherein the pH is about 2 and the temperature is about 4° C.

13. A process according to claim 8, wherein step (a), the residence time in the column is 10 to 20 minutes.

14. A process according to claim 13, wherein the aqueous solvent is water, and wherein the plant material comprises pre-dried leaves.

15. A process according to claim 13, wherein step (e) the temperature of the feed is room temperature.

16. A process according to claim 15, wherein step (f) the temperature of the feed is about 80° C.

17. A process according to claim 16, wherein step (e) the molecular weight cut-off of the membrane is about 2.5 kDa.

18. A process according to claim 17, wherein step (f) the molecular weight cut-off of the membrane is about 400 Da.

19. A process according to claim 14, wherein the leaves are comminuted to a size of 10 to 40 mm.

20. A process according to claim 19, wherein step (c) the leaf: water ratio is about 0.05:1 w/w.

* * * * *